No. 661,338. Patented Nov. 6, 1900.
T. GREEN.
BICYCLE SADDLE.
(Application filed Oct. 11, 1899.)
(No Model.)
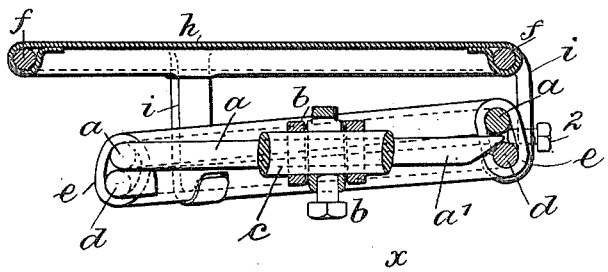
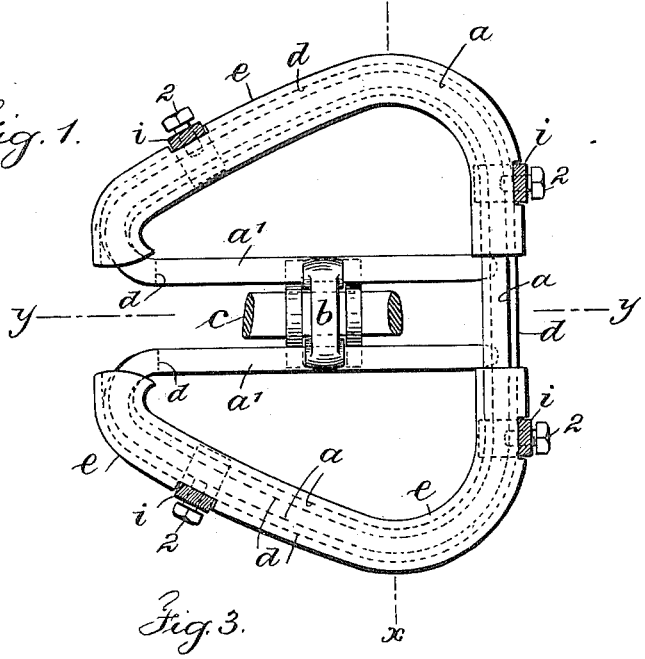
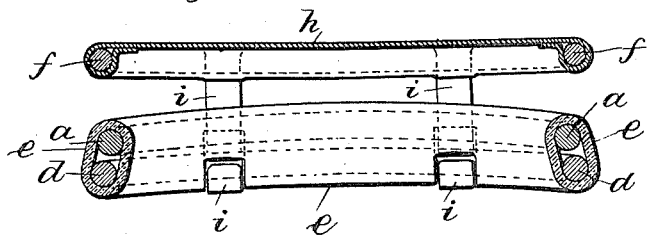
Witnesses
Chas. H. Smith
Geo. T. Pinckney
Inventor
Thomas Green
per L. W. Serrell & Son
Atty.
THE NORRIS PETERS CO., PHOTO-LITHO., WASHINGTON, D. C.

UNITED STATES PATENT OFFICE.

THOMAS GREEN, OF NEWARK, NEW JERSEY.

BICYCLE-SADDLE.

SPECIFICATION forming part of Letters Patent No. 661,338, dated November 6, 1900.

Application filed October 11, 1899. Serial No. 733,304. (No model.)

*To all whom it may concern:*

Be it known that I, THOMAS GREEN, a subject of the Queen of Great Britain, residing at Newark, in the county of Essex and State of New Jersey, have invented an Improvement in Bicycle-Saddles, of which the following is a specification.

Yielding devices of various kinds have been heretofore employed in connection with bicycles for the purpose of absorbing vibration to relieve the rider of the tremor and shock of riding, especially upon stone pavements.

My invention has the same object in view; and it relates to a saddle having a two-part frame connected solely by a tube of yielding material which yields more or less under the weight of the rider and concussion resulting from the inequalities of the road.

I employ a metal frame of substantially triangular outline with parallel inturned ends located centrally of the frame and a clip to connect said parts to the bicycle seat-post. An auxiliary frame similar to the aforesaid frame, but without the inturned ends, is located below and parallel with the aforesaid frame, and the two frames are connected by a yielding tubing or tubular envelop extending around and inclosing the frames longitudinally or throughout their length, and this yielding medium is preferably a tube of rubber surrounding both frames. A frame of metal supporting a flexible leather forming the seat of the saddle and which leather is properly sewed to the metal frame and is provided with arms from the said frame extending downward and connected with the lowermost frame, so that the weight of the rider is carried by the lowermost frame and the yielding material from the fixed frame.

In the drawings, Figure 1 is a plan view representing my improvement without the flexible leather seat or frame. Fig. 2 is a vertical longitudinal section at $y$ $y$ of Fig. 1. Fig. 3 is a vertical cross-section at $x$ $x$ of Fig. 1, Figs. 2 and 3 both showing the flexible leather seat, its frame, and arms supporting the same from the lowermost frame.

The metal frame $a$, of substantially triangular form, is provided with the inturned parallel ends $a'$, to which the clip $b$ is connected, the seat-post $c$ passing through the clip $b$ to connect these parts firmly to the bicycle. The auxiliary frame $d$ is also of substantially triangular form, but without the inturned ends, the said ends of the frame stopping at the forward part. This frame $d$ is placed below the frame $a$ and is parallel thereto, and a yielding tubing or tubular envelop $e$ extends around and incloses the two frames. This is preferably a rubber tube, inside the body of which both frames are placed, the tube being arranged parallel with the frames; but I do not limit myself to the use of a rubber tube.

A frame $f$, of metal, is provided that is substantially the shape of the seat desired. This is preferably covered with a flexible leather strip $h$, carried around the frame and secured thereto by sewing, and I provide arms formed with the frame $f$ and extending downward to a connection with the auxiliary frame $d$. I prefer to make the lower ends of the arms $i$ hook-shaped, with clamping-screws 2, and to cut away the under side of the flexible tubing $e$, so as to bring the hook ends of the arms $i$ and the clamping-screws into rigid engagement with the triangular frame $d$.

I do not limit myself to the frame $f$ or the flexible leather seat $h$, as any suitable form of seat or saddle may be provided and to which arms similar to the arms $i$ may be connected and extend downward to engage the auxiliary frame $d$.

In use the weight of the rider upon the frame $f$ and leather seat $h$ is transmitted to the auxiliary frame $d$ and is supported or carried by the flexible tubing $e$. This tubing yields in proportion to the weight, either evenly or more at the back or more forward, according to the position of the rider upon the seat. This yielding tubing absorbs the vibration or tremor or shock incident to riding over uneven surfaces.

I claim as my invention—

1. The combination with a frame and a clip for connecting the same to the bicycle seat-post, of an auxiliary frame parallel with and located below the aforesaid frame, a yielding tubular envelop inclosing both frames and connecting the same and through the body of which the frames pass, arms from the auxiliary frame extending upward and a frame and leather seat supported thereby, substantially as set forth.

2. The combination with a seat and downwardly-extending arms, of an auxiliary frame of substantially triangular form and connected to the lower end of the arms, a frame of substantially triangular form with parallel inturned ends that are located centrally of the frame and a clip for connecting the said ends to the seat-post, the said frame being located above the auxiliary frame and a rubber tubing arranged parallel with said frames and inside the body of which said frames are placed, the weight of the rider being carried upon the lowermost and auxiliary frame, substantially as and for the purposes set forth.

Signed by me this 22d day of September, 1899.

THOMAS GREEN.

Witnesses:
GEO. T. PINCKNEY,
E. E. POHLÉ.